(12) United States Patent
Johnson et al.

(10) Patent No.: US 10,895,676 B2
(45) Date of Patent: Jan. 19, 2021

(54) OPTICAL STACK INCLUDING REFLECTIVE POLARIZER AND COMPENSATION FILM

(71) Applicants: 3M Innovative Properties Company, St. Paul, MN (US); Nitto Denko Corporation, Osaka (JP)

(72) Inventors: Matthew B. Johnson, St. Paul, MN (US); Chikara Abe, Yamagata (JP); Hiroaki Sawada, Yamagata (JP); Minoru Miyatake, Osaka (JP)

(73) Assignees: 3M Innovative Properties Company, St. Paul, MN (US); Nitto Denko Corporation, Osaka (JP)

( * ) Notice: Subject to any disclaimer, the term of this patent is extended or adjusted under 35 U.S.C. 154(b) by 0 days.

(21) Appl. No.: 15/541,280

(22) PCT Filed: Dec. 29, 2015

(86) PCT No.: PCT/US2015/067940
§ 371 (c)(1),
(2) Date: Jun. 30, 2017

(87) PCT Pub. No.: WO2016/109587
PCT Pub. Date: Jul. 7, 2016

(65) Prior Publication Data
US 2017/0371083 A1    Dec. 28, 2017

Related U.S. Application Data

(60) Provisional application No. 62/098,060, filed on Dec. 30, 2014.

(51) Int. Cl.
*G02B 5/30* (2006.01)
*G02F 1/1335* (2006.01)

(52) U.S. Cl.
CPC ......... *G02B 5/3041* (2013.01); *G02B 5/3083* (2013.01); *G02F 1/133536* (2013.01)

(58) Field of Classification Search
CPC ...... G02B 5/305; G02B 5/287; G02B 5/0841; G02B 5/3025; G02B 5/3033;
(Continued)

(56) References Cited

U.S. PATENT DOCUMENTS 3,610,729 A    10/1971  Rogers
4,446,305 A    5/1984   Rogers et al.
(Continued)

FOREIGN PATENT DOCUMENTS

CN    1459654 A    12/2003
CN    1475844 A    2/2004
(Continued)

OTHER PUBLICATIONS

Weber et al., "Giant Birefringent Optics in Multilayer Polymer Mirrors," Science Magazine, vol. 287, Mar. 31, 2000, pp. 2451-2456.
(Continued)

*Primary Examiner* — Balram T Parbadia
(74) *Attorney, Agent, or Firm* — Shumaker & Sieffert, P.A.

(57) ABSTRACT

An optical stack includes a liquid crystal panel with a color filter array. The liquid crystal panel has a filter side closest to the color filter array and a non-filter side opposite the filter side. An absorbing polarizer is laminated directly to the filter side of the liquid crystal panel, and a reflective polarizer laminated directly to the absorbing polarizer.

19 Claims, 3 Drawing Sheets

(58) Field of Classification Search
CPC .......... G02B 5/3041; G02B 1/08; G02B 5/30; G02F 1/133536; G02F 2001/133507; G02F 1/133528; G02F 1/133514; G02F 1/133602; G02F 2001/136222
See application file for complete search history.

(56) References Cited

U.S. PATENT DOCUMENTS

| | | | |
|---|---|---|---|
| 4,540,623 | A | 9/1985 | Im et al. |
| 5,103,337 | A | 4/1992 | Schrenk et al. |
| 5,360,659 | A | 11/1994 | Arends et al. |
| 5,448,404 | A | 9/1995 | Schrenk et al. |
| 5,882,774 | A | 3/1999 | Jonza et al. |
| 6,124,971 | A * | 9/2000 | Ouderkirk ............... B32B 27/36 359/485.03 |
| 6,157,490 | A | 12/2000 | Wheatley et al. |
| 6,317,181 | B1 * | 11/2001 | Hoshino ........... G02F 1/133536 349/106 |
| 6,368,699 | B1 | 4/2002 | Gilbert et al. |
| 6,531,230 | B1 | 3/2003 | Weber et al. |
| 6,783,349 | B2 | 8/2004 | Neavin et al. |
| 6,847,427 | B2 | 1/2005 | Yamauchi |
| 7,106,395 | B2 | 9/2006 | Maeda |
| 7,791,687 | B2 | 9/2010 | Weber et al. |
| 8,120,730 | B2 * | 2/2012 | Weber ............... G02F 1/133536 349/96 |
| 8,125,589 | B2 * | 2/2012 | Ko .................... G02F 1/133606 349/64 |
| 9,103,988 | B2 | 8/2015 | Ishiguro |
| 9,158,155 | B2 | 10/2015 | Weber |
| 9,164,210 | B2 | 10/2015 | Sawada et al. |
| 10,001,669 | B2 * | 6/2018 | Fuchida ............... G02B 5/0231 |
| 2003/0002154 | A1 * | 1/2003 | Trapani ................ G02B 5/3033 359/487.01 |
| 2004/0061812 | A1 | 4/2004 | Maeda |
| 2007/0236636 | A1 | 10/2007 | Watson et al. |
| 2008/0151147 | A1 | 6/2008 | Weber et al. |
| 2009/0122228 | A1 * | 5/2009 | Ko .................... G02F 1/133606 349/64 |
| 2011/0141398 | A1 * | 6/2011 | Shin .................. G02F 1/133555 349/64 |
| 2013/0101816 | A1 * | 4/2013 | Liu ........................... B32B 7/02 428/212 |
| 2013/0242228 | A1 * | 9/2013 | Park .................. G02F 1/133617 349/61 |
| 2013/0258250 | A1 | 10/2013 | Jung et al. |
| 2015/0226999 | A1 * | 8/2015 | Fuchida ............... G02B 5/0242 349/96 |
| 2015/0234106 | A1 * | 8/2015 | Nakamura ............. G02B 5/305 349/96 |
| 2015/0277012 | A1 * | 10/2015 | Nakamura ........... G02B 5/3083 349/96 |
| 2016/0131927 | A1 * | 5/2016 | Maesawa .......... G02F 1/133524 349/57 |

FOREIGN PATENT DOCUMENTS

| | | |
|---|---|---|
| CN | 101410738 A | 4/2009 |
| CN | 102576110 B | 2/2016 |
| EP | 1930750 A1 | 11/2008 |
| JP | 2003084137 A | 3/2003 |
| JP | 2013037115 A | 2/2013 |
| JP | 2013214070 A | 10/2013 |
| KR | 20120107482 A | 10/2012 |
| TW | 200837405 A | 9/2008 |
| WO | 9517303 A1 | 6/1995 |
| WO | 9939224 A1 | 8/1999 |
| WO | 2007029788 A1 | 3/2007 |

OTHER PUBLICATIONS

International Preliminary Report on Patentability from International Application No. PCT/US2015/067940, dated Jul. 13, 2017, 8 pp.
International Search Report and Written Opinion of International Application No. PCT/US2015/067940, dated Mar. 15, 2016, 11 pp.
Communication Pursuant to Rules 161(1) and 162 EPC dated Aug. 10, 2017, from counterpart European Application No. 15825753.5, 2 pp.
Response to Communication Pursuant to Rules 161(1) and 162 EPC dated Aug. 10, 2017, from counterpart European Application No. 15825753.5, filed Feb. 20, 2018, 6 pp.
Written Opinion from counterpart Singaporean Application No. 11201705309X dated Mar. 23, 2018, 5 pp.
The Notification of Reason for Rejection, and translation thereof, from counterpart Japanese Application No. 2017-553311, dated Jul. 24, 2018, 13 pp.
Notice of Intent to Grant and Text Intended to Grant from counterpart European Application No. 15825753.5, dated Jul. 25, 2018, 23 pp.
Notice of Preliminary Rejection, and translation thereof, from counterpart Korean Application No. 10-2017-7020981, dated Jun. 20, 2018, 11 pp.
Office Action from counterpart Chinese Application No. 201580071941.7, dated Dec. 4, 2018, 16 pp.
Notification of the Third Office Action and translation thereof from counterpart CN Application No. 201580071941.7 dated Mar. 3, 2020, 36 pgs.
Notice of Reasons for Refusal and translation thereof from counterpart JP Application No. 2017-553311 dated Jan. 29, 2020, 5 pgs.
Letters Patent and translation thereof from counterpart KR Application No. 10-2017-7020981 dated Feb. 26, 2020, 3 pgs.
Decision of Rejection and translation thereof from CN Application No. 201580071941.7, dated Aug. 24, 2020, 7 pgs.

* cited by examiner

OPTICAL STACK INCLUDING REFLECTIVE POLARIZER AND COMPENSATION FILM

BACKGROUND

Optical stacks-especially those with highly particular optical properties—are useful in various display applications. Absorbing and reflective (also called reflecting) polarizers can be arranged and configured in conjunction with liquid crystal panels, along with other films, including compensation films. One or more of these films within the stack may be a multilayer optical film.

Absorbing polarizers substantially absorb light of one polarization while substantially transmitting light of an orthogonal polarization. Absorbing polarizers are generally formed by incorporating certain oriented dyes or stains within or on a polymeric substrate.

Reflective polarizers substantially reflect light of one polarization while substantially transmitting light of an orthogonal polarization. Multilayer reflective polarizers (and many multilayer optical films generally) are formed by coextruding tens to hundreds of molten polymer layers and subsequently orientating or stretching the resulting film.

Some compensation films modify the retardation values between two linearly polarized light elements oriented perpendicularly to one another. Some compensation films can compensate for non-uniformities in optical performance for other optical components, including the liquid crystal panel, absorbing polarizers, and reflective polarizers.

SUMMARY

In one aspect, the present disclosure relates to optical stacks. The optical stack includes a liquid crystal panel including a color filter array, the liquid crystal panel including a filter side closest to the color filter array and a non-filter side opposite the filter side and an absorbing polarizer laminated directly to the filter side of the liquid crystal panel. The optical stack also includes a reflective polarizer laminated to the absorbing polarizer.

In another aspect, the present disclosure relates to optical stacks. The optical stack includes a liquid crystal panel including a backlight-side substrate, a front-side substrate, and a liquid crystal layer disposed between the backlight-side substrate and the front-side substrate, a light scattering intensity of the backlight-side substrate being higher than a light-scattering intensity of the front-side substrate. The optical stack also include an absorbing polarizer laminated directly to the backlight-side substrate and a reflective polarizer laminated to the absorbing polarizer.

DETAILED DESCRIPTION

Figure 1:
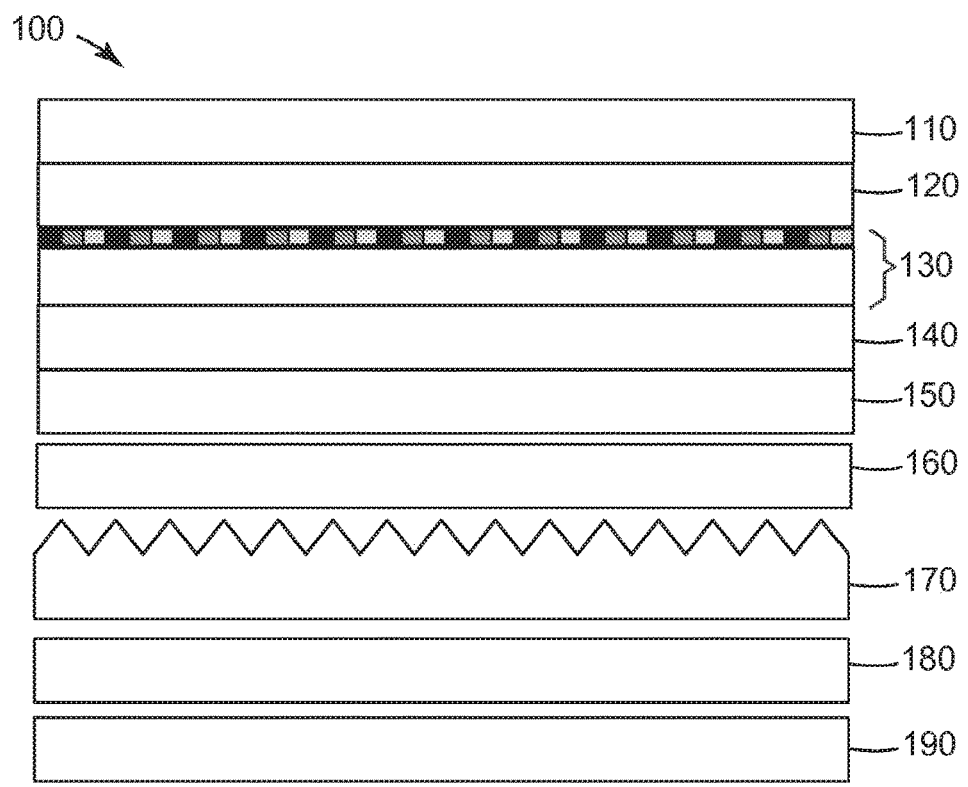
FIG. 1 is an elevation cross-section of the optical stack of Comparative Example 1.

Optical stacks, particularly optical stacks for displays and especially for liquid crystal displays, generally require a complicated and precise arrangement of specialized optical films in order to maximize brightness and performance. Often, based on the particular application needs of the display, the designer must balance performance with thickness. In other words, adding more films may increase performance but at the cost of a thicker display, adding weight and manufacturing complexity as well as overall display thickness. Another common challenge is the balance between overall light throughput and contrast ratio. Contrast ratio in the context of a display generally refers to the different in brightness between that display's maximum and minimum brightness values. Often, modifications and design decisions that provide improved maximum brightness also cause a drop in contrast ratio (i.e., the minimum brightness is higher). Both values are in generally important to a viewer or consumer (e.g. poor contrast ratio may cause an image to appear washed out or oversaturated while poor brightness may make the display unsuitable for viewing in sunlight or even a bright room). Lower profile thin displays (which may require removal of films that would otherwise improve contrast, brightness, or both) are as well, further complicating the design process.

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters*. 2nd Ed., Macmillan Publishing Co. (1986) and by A. Thelan, *Design of Optical Interference Filters*, McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. Thicker layers may be included, such as skin layers at the outer surfaces of the multilayer optical film, or protective boundary layers (PBLs) disposed within the multilayer optical films, that separate coherent groupings (referred to herein as "packets") of microlayers.

For polarizing applications, e.g., for reflective polarizers, at least some of the optical layers are formed using birefringent polymers, in which the polymer's index of refraction has differing values along orthogonal Cartesian axes of the polymer. Generally, birefringent polymer microlayers have their orthogonal Cartesian axes defined by the normal to the layer plane (z-axis), with the x-axis and y-axis lying within the layer plane. Birefringent polymers can also be used in non-polarizing applications.

In some cases, the microlayers have thicknesses and refractive index values corresponding to ¼-wave stack, i.e., arranged in optical repeat units or unit cells each having two adjacent microlayers of equal optical thickness (f-ratio=50%), such optical repeat unit being effective to reflect by constructive interference light whose wavelength λ is twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. Se, e.g., U.S. Pat. No. 5,360,659 (Arends et al.) and U.S. Pat. No. 5,103,337 (Schrenk et al.). Thickness gradients along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See. e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_x \geq 0$.

In practice, the refractive indices are controlled by judicious materials selection and processing conditions. A multilayer film is made by co-extrusion of a large number, e.g. tens or hundreds of layers of two alternating polymers A, B, typically followed by passing the multilayer extrudate through one or more multiplication die, and then stretching or otherwise orienting the extrudate to form a final film. The resulting film is typically composed of many hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers typically exhibit a difference in refractive index ($\Delta n_x$) for light polarized along the x-axis of at least 0.05. In some embodiments, materials are selected such that the difference in refractive index for light polarized along the x-axis is as high as possible after orientation. If the high reflectivity is desired for two orthogonal polarizations, then the adjacent microlayers also can be made to exhibit a difference in refractive index ($\Delta n_y$) for light polarized along the y-axis of at least 0.05.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$, or $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

The '774 (Jonza et al.) patent also discusses certain design considerations relating to multilayer optical films configured as polarizers, referred to as multilayer reflecting or reflective polarizers. In many applications, the ideal reflecting polarizer has high reflectance along one axis (the "extinction" or "block" axis) and zero reflectance along the other axis (the "transmission" or "pass" axis). For the purposes of this application, light whose polarization state is substantially aligned with the pass axis or transmission axis is referred to as pass light and light whose polarization state is substantially aligned with the block axis or extinction axis is referred to as block light. Unless otherwise indicated, pass light at 600 incidence is measured in p-polarized pass light. If some reflectivity occurs along the transmission axis, the efficiency of the polarizer at off-normal angles may be reduced, and if the reflectivity is different for various wavelengths, color may be introduced into the transmitted light. Furthermore, exact matching of the two y indices and the two z indices may not be possible in some multilayer systems, and if the z-axis indices are not matched, introduction of a slight mismatch may be desired for in-plane indices n1y and n2y. In particular, by arranging the y-index mismatch to have the same sign as the z-index mismatch, a Brewster effect is produced at the interfaces of the microlayers, to minimize off-axis reflectivity, and therefore off-axis color, along the transmission axis of the multilayer reflecting polarizer.

Another design consideration discussed in '774 (Jonza et al.) relates to surface reflections at the air interfaces of the multilayer reflecting polarizer. Unless the polarizer is laminated on both sides to an existing glass component or to another existing film with clear optical adhesive, such surface reflections will reduce the transmission of light of the desired polarization in the optical system. Thus, in some cases it may be useful to add an antireflection (AR) coating to the reflecting polarizer.

Reflective polarizers are often used in visual display systems such as liquid crystal displays. These systems—now found in a wide variety of electronic devices such as mobile phones, computers including tablets, notebooks, and subnotebooks, and some flat panel TVs—use a liquid crystal (LC) panel illuminated from behind with an extended area backlight. The reflective polarizer is placed over or otherwise incorporated into the backlight to transmit light of a polarization state useable by the LC panel from the backlight to the LC panel. Light of an orthogonal polarization state, which is not useable by the LC panel, is reflected back into the backlight, where it can eventually be reflected back towards the LC panel and at least partially converted to the useable polarization state, thus "recycling" light that would normally be lost, and increasing the resulting brightness and overall efficiency of the display.

Contrast ratio—that is, the ratio of transmission for light whose polarization axis is aligned with the pass axis of the reflective polarizer to transmission for light whose polarization axis is aligned with the block axis of the reflective polarizer—is another important metric for quantifying the performance of a reflective polarizer. The contrast ratio may be measured for the reflective polarizer alone or for the reflective polarizer incorporated into a backlight, for example, in combination with a liquid crystal display panel and an absorbing polarizer. Contrast ratio therefore may generally be improved by higher overall pass light transmission or lower overall block light transmission.

Several design considerations may be conventionally relevant in display optical stack design. For example, certain multilayer reflective polarizer products are intended to be used as free-floating optical films. By free floating, it is generally meant that there is in air interface between the top and bottom surfaces of the film and adjacent optical films or component, as opposed to being laminated to adjacent layers via an optically clear adhesive or other attachment means. Other multilayer reflective polarizer products are designed to be laminated to an optical stack. Such films are often referred to as on-glass polarizers. Typically, incorporating on-glass reflective polarizers versus free-floating reflective polarizers will increase luminance at the expense of contrast ratio.

Optical compensation films may be included in optical stacks to compensate for non-uniform polarization rotation or absorption from other components within the optical stack. Typically compensation films are weak or non-linear retardation films which may help to optimize the characteristics of light traveling through the optical stack. For example, if a certain absorbing polarizer, disposed on the light input side of a liquid crystal panel, absorbs less blue light than optimal (and therefore passes more blue light than optimal), a compensation film may slightly rotate the polarization state of the transmitted blue light. Therefore, as it passes through a liquid crystal panel and through a second absorbing polarizer disposed on the output side of the liquid crystal panel, more blue light may be absorbed than otherwise would be in the case of the configuration without the compensation film. Likewise, if a liquid crystal panel over-rotates the polarization of light intended to be absorbed by the second absorbing polarizer, a compensation film provided between the liquid crystal panel and the second absorbing polarizer may help to correct the over-rotation, thereby improving contrast. Unfortunately, inclusion of these compensation films inevitably adds thickness to the overall optical stack. Nonetheless, two compensation films are typically used, one on either side of the liquid crystal panel.

In describing the retardation films herein, there are several particular terms where particular definitions are helpful. "$n_{rx}$" denotes a refractive index in a direction (e.g., a slow axis direction or molecular direction) in which a refractive index in a plane is generally at a maximum. "$n_{ry}$" denotes a refractive index in a direction perpendicular to a slow axis in a plane. "$n_{rz}$" denotes a refractive index in a thickness direction. Re[$\lambda$] refers to an in-plane retardation of a film at a wavelength of $\lambda$ (nm) at 23° C. Re[$\lambda$] is obtained by Re[$\lambda$]=($n_{rx}-n_{ry}$)×d, when d (nm) is a thickness of a film. Rth[$\lambda$] refers to a thickness-direction retardation of a film at a wavelength of $\lambda$ (nm) at 23° C. Rth[$\lambda$] is obtained by Rth[$\lambda$]=[($n_{rx}+n_{ry}$)/2$-n_{rz}$]×d, when d (nm) is a thickness of a film. An $N_{rz}$ coefficient is obtained by $N_{rz}=(n_{rx}-n_{rz})/(n_{rx}-n_{ry})$. $\Delta n_{r}*d$ can refer to Re[$\lambda$].

The optical properties of the compensation film including one or more compensation layers is controlled so as to increase the contrast ratio of the optical stack in the oblique direction and reduce the color shift in the black state of the liquid crystal display. The desirable retardation of the compensation film depends on the optical properties of a liquid crystal panel (in particular, the liquid crystal layer). One exemplary film has retardation values satisfying the following relationship:

30 nm≤Re[550]≤90 nm 170 nm≤Rth[550]≤300 nm

Further, as described above, the appropriate or desirable range of retardation-especially Rth[$\lambda$]—of the compensation film laminated to the non-filter side of the liquid crystal panel varies depending on the value $\Delta n_{r}*d[\lambda]$ of the liquid crystal layer. An example of the range of retardation may satisfy the following:

$\Delta n_{r}*d[550]-70 \leq Re[550] \leq \Delta n_{r}*d[550]-10$

For increasing the luminance of the optical stack, $\Delta n_{r}*d$ [550] may be less than 280 nm. In this case, Rth[$\lambda$] of the compensation film laminated to the non-filter side of the liquid crystal panel satisfies the following relationship:

220 nm≤Rth[550]≤300 nm

Furthermore, for increasing the contrast ratio of the optical stack in the oblique direction and reduce the color shift at the black-state display, the compensation film laminated to the non-filter side of the liquid crystal panel preferably satisfies as follows:

$n_{rx}>n_{ry}>n_{rz}$ (that is, $N_{rz}>1$)

Many types of liquid crystal panels exist and have varying advantages and disadvantages including brightness, contrast, color artifacts, switching time, viewing angle, and cost.

In a general sense, however, all liquid crystals function generally through electrically manipulating liquid crystal molecules in order to provide polarization based light gating for the display. Examples include thin-film transistor liquid crystal panels, including in-plane switching (IPS) type displays, and vertically aligned (VA) type displays. Color filters may be positioned on the front or back side of the liquid crystal panel to filter certain wavelengths of light and generate colored subpixels. Color filter on array (COA) VA TFT-LCDs have the color filter disposed on the backlight or reflective polarizer side of the liquid crystal panel, while non-color filter on array VA TFT-LCD have the color filter disposed on the opposite side; i.e., the viewer side of the liquid crystal panel. The backlight-side substrate and front-side or viewer-side substrate may each be characterized by values of I[λ], where I[λ] denotes a light-scattering intensity of a substrate at a wavelength of λ (in nm) at 23° C. Typically, non-color filter on array type optical stacks are utilized based on the conventional understanding that these provide more desirable optical performance.

Surprisingly, optical stacks utilizing a single optical compensation film with a COA VA TFT-LCD and an on-glass polarizer provided a higher contrast ratio than with a free-floating reflective polarizer and two compensation films with only a minimal drop in brightness. Further, a single optimized optical compensation film with a COA VA TFT-LCD and an on-glass polarizer provided higher contrast ratio and higher brightness than with a free-floating reflective polarizer and two compensation films. Because these solutions eliminate films or require thinner components, these optical stacks may enable superior brightness, contrast, and thinness. Further, because of the design flexibility in overall display configurations, the skilled designer may provide additional modifications to provide, for example, even more brightness, while still being able to maintain a contrast ratio better than conventional configurations.

Additional conventional layers and optical components may be included in the optical stacks. For example, protective films, tie layers, and optically clear adhesives may form part of the optical stacks discussed herein.

EXAMPLES

Comparative Example 1

A Sony NSX-32GT1 television set (available from Sony USA, New York N.Y.) was measured for brightness (luminance) and contrast ratio (white state transmission/black state transmission) using an Eldim EZContrast88LW (available from Market Tech Inc., Scotts Valley Calif.) Spectroradiometer. The results are presented in Table 1. The 'as received' display construction 100, displayed in FIG. 1, included the following: viewer side absorbing polarizer, comprised of protecting film (not shown), iodine stained poly(vinyl alcohol) or PVA (110), and compensation film (120), which was adhered to the Vertically Aligned (VA) type TFT-LCD panel (non-color filter on array type, $I_{back}$ [550]<$I_{front}$ [550]) (130) supplied by AU Optronics Corp., Hsinchu Taiwan, with optically clear adhesive (OCA) where on the opposite side (backlight side) of the display (not shown). Another absorbing polarizer adhered with OCA (not shown) was laminated to the VA display, where the absorbing polarizer was also comprised of a compensation film (140), iodine stained PVA (150), and protecting film (not shown). Beneath the back-light side absorbing polarizer and separated by an air gap, a DBEF-D2-400 sheet was located (160), available from 3M Company, St. Paul Minn., where beneath the DBEF-D2-400 sheet a prism film sheet (170), followed by a microlens sheet (180), and then a light guide plate (LGP) (190) was located. The non-color filter on array VA type TFT-LCD is one where the color filter is located on the viewer side of the LCD cell versus on the backlight side of the cell. The luminance and contrast ratio measured for Comparative Example 1 were 295 cd/m² and 5950.

Comparative Example 2

Figure 2:
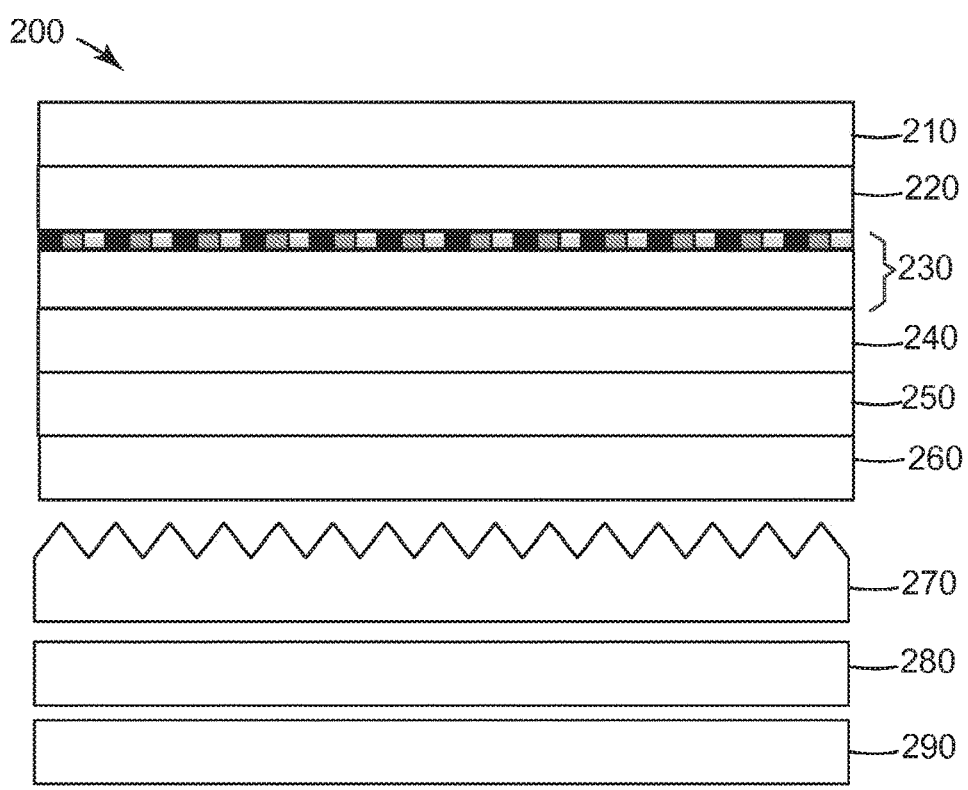
FIG. 2 is an elevation cross-section of the optical stack of Comparative Example 2.

An optical stack was assembled as in Comparative Example 1, except that the DBEF-D2-400 film was removed. A DBEF-Qv3 sheet (260) was laminated to the iodine stained PVA (250) of the absorbing polarizer using an OCA, where DBEF-Qv3 is a reflective polarizer with a diffuse matte coating possessing 28 percent haze available from 3M Company. The diffuse matte coating was towards the prism film. The construction 200 is shown in FIG. 2 and also included a viewer side absorbing polarizer including a protecting film (not shown), iodine stained poly(vinyl alcohol) or PVA (210), and compensation film (220), which was adhered to the Vertically Aligned (VA) type TFT-LCD panel (non-color filter on array type, $I_{back}$ [550]<$I_{front}$ [550]) (230) supplied by AU Optronics Corp., Hsinchu Taiwan, with optically clear adhesive (OCA) where on the opposite side (backlight side) of the display (not shown). Another absorbing polarizer adhered with OCA (not shown) was laminated to the VA display, where the absorbing polarizer also included a compensation film (240), the iodine stained PVA (250), and protecting film (not shown). Beneath the backlight side absorbing polarizer, the DBEF-Qv3 sheet was laminated (260). Beneath the DBEF-Qv3 sheet was located a prism film sheet (270), followed by a microlens sheet (280), and then a light guide plate (LGP) (290).

The luminance and contrast ratio measured for Comparative Example 2 were 305 cd/m² and 5050. Thus, compared to Comparative Example 1, Comparative Example 2 has approximately 4 percent higher brightness and 85 percent the contrast ratio. The resulting data are shown in Table 1.

TABLE 1

Luminance and contrast ratio for Comparative Examples 1 and 2 using Sony NSX-32GT1 with standard color filter on viewer-side VA TFT-LCD

|  | Comparative Example 1 | Comparative Example 2 |
|---|---|---|
| Luminance (cd/m²) | 295 | 305 |
| % Ratio | 100% | 103% |
| Contrast Ratio | 5950 | 5050 |
| % Ratio | 100% | 85% |

Comparative Example 3

Figure 3:
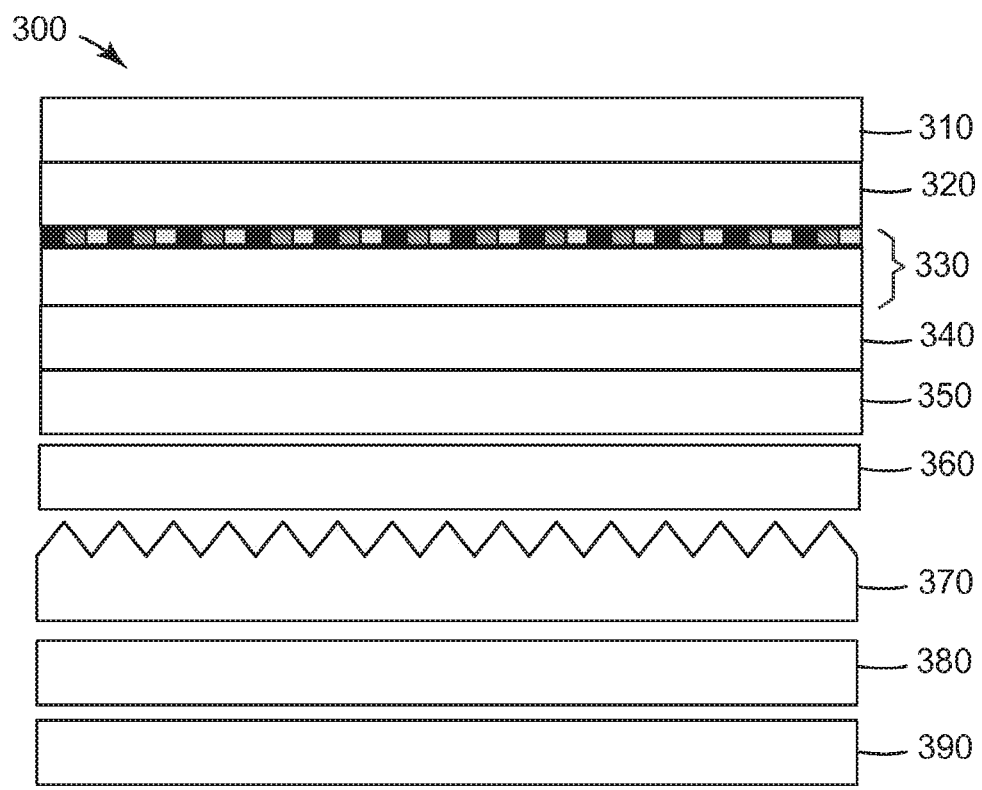
FIG. 3 is an elevation cross-section of the optical stack of Comparative Example 3.

A Samsung UN32ES6500 TV television set (available from Samsung, Suwon, South Korea) was measured for brightness (luminance) and contrast ratio (white state transmission/black state transmission) using an Eldim EZContrast88LW (available from Market Tech Inc., Scotts Valley Calif.) Spectroradiometer. The results are presented in Table 2. For Comparative Example 3, the film stack construction 300, displayed in FIG. 3, which is similar to FIG. 1, consisted of the following: viewer side absorbing polarizer, comprised of protecting film, iodine stained poly (vinyl alcohol) or PVA (310), and compensation film (320), which was adhered to the Vertically Aligned (VA) type TFT-LCD panel (non-color filter on array type, $I_{back}$ [550]

<I_{front} [550]) (330) supplied by Samsung, Suwon, South Korea, with optically clear adhesive (OCA) where on the opposite side (backlight side) of the display another absorbing polarizer adhered with OCA was laminated to the VA display, where the absorbing polarizer was also comprised of a compensation film (340), iodine stained PVA (350), and protecting film. Beneath the backlight side absorbing polarizer and separated by an air gap, a DBEF-D2-400 sheet (360) was located, available from 3M Company, St. Paul Minn., where beneath the DBEF-D2-400 sheet a prism film sheet (370), followed by a microlens sheet (380), and then a light guide plate (LGP) (390) was located. The luminance and contrast ratio measured for Comparative Example 3 were 458 cd/m² and 3913.

Comparative Example 4

An optical stack was assembled as in Comparative Example 3, except that the DBEF-D2-400 film was removed. A DBEF-Qv3 sheet was laminated to the absorbing polarizer using an OCA where DBEF-Qv3 is a reflective polarizer with a diffuse matte coating possessing 28 percent haze available from 3M Company. The diffuse matte coating was towards the prism film.

The luminance and contrast ratio measured for Comparative Example 4 were 479 cd/m² and 3487. Thus, compared to Comparative Example 3, Comparative Example 4 has approximately 5 percent higher brightness and 89 percent the contrast ratio. The resulting data are shown in Table 2.

TABLE 2

Luminance and contrast ratio for Comparative Examples 3 and 4 using Samsung UN32ES6500 TV with standard color filter on viewer side VA TFT-LCD

|  | Comparative Example 3 | Comparative Example 4 |
| --- | --- | --- |
| Luminance (cd/m²) | 458 | 479 |
| % Ratio | 100% | 105% |
| Contrast Ratio | 3913 | 3487 |
| % Ratio | 100% | 89% |

Comparative Example 5

Figure 4:
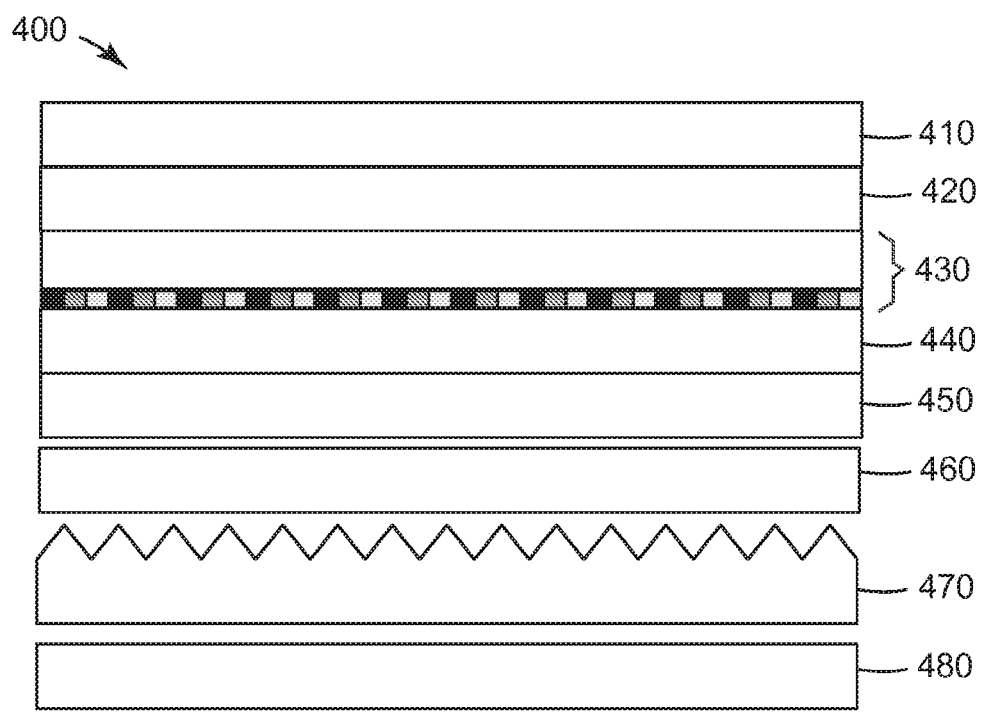
FIG. 4 is an elevation cross-section of the optical stack of Comparative Example 5.

A SONY KDL-32HX750 television set (available from Sony USA, New York N.Y.) was measured for brightness (luminance) and contrast ratio (white state transmission/black state transmission) as previously described. The results are presented in Table 3. The 'as received' display construction 400, displayed in FIG. 4, consisted of the following: viewer side absorbing polarizer, comprised of protecting film, iodine stained poly(vinyl alcohol) or PVA (410), and compensation film (420), which was adhered to the Vertically Aligned (VA) type TFT-LCD panel (color filter on array, COA type, $I_{back}$ [550]<$I_{front}$ [550]) (430) supplied by Samsung Display Corp., Suwon, South Korea, with optically clear adhesive (OCA) where on the opposite side (backlight side) of the display another absorbing polarizer adhered with OCA was laminated to the VA display, where the absorbing polarizer was also comprised of a compensation film (440), iodine stained PVA (450), and protecting film. Beneath the backlight side absorbing polarizer and separated by an air gap, a DBEF-D3-340 sheet (460) was located, available from 3M Company, St. Paul Minn., where beneath the DBEF-D3-340 sheet a prism film sheet (470), and then a diffuser sheet (480) was located. The luminance and contrast ratio measured for Comparative Example 5 were 341 cd/m2 and 3525.

Comparative Example 6

An optical stack was assembled as in Comparative Example 5, except that the DBEF-D3-340 (460) film was replaced with DBEF-D2-400 as available from 3M Company.

The luminance and contrast ratio measured for Comparative Example 6 were 348 cd/m2 and 2784. Thus, compared to Comparative Example 5, Comparative Example 6 has approximately 2 percent higher brightness and 79 percent the contrast ratio.

Example 1

Figure 5:
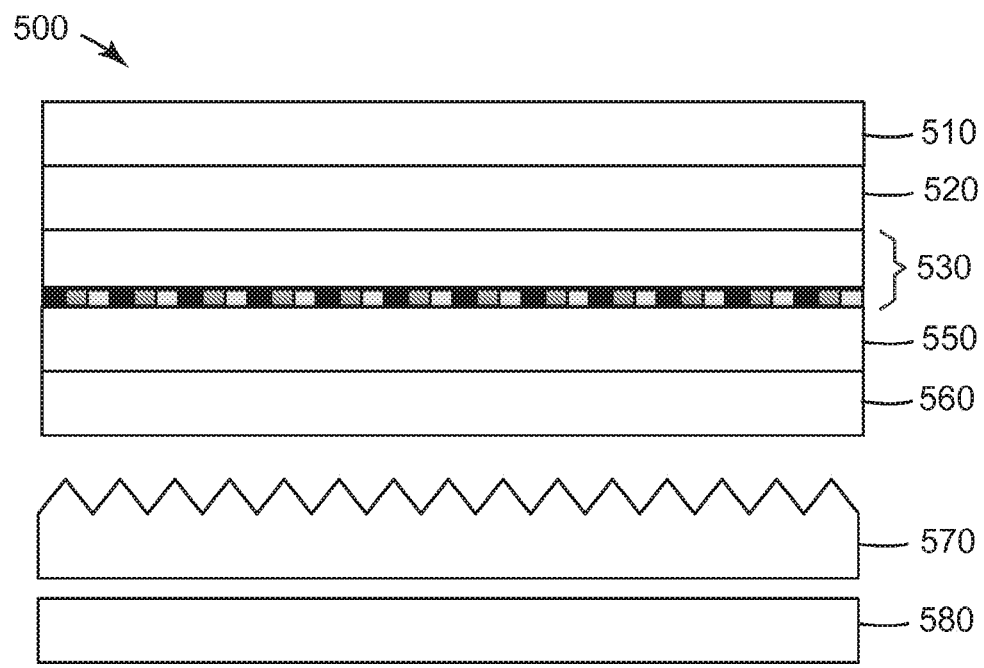
FIG. 5 is an elevation cross-section of the optical stack of Example 1.

An optical stack was assembled as in Comparative Example 5, except that the backlight-side absorbing polarizer (440) and DBEF-D3-340 film (460) were removed. In their place, an absorbing polarizer without a viewing angle compensation film (550) was laminated to the COA VA TFT-LCD panel. This polarizer was supplied by Nitto Denko Corp, Osaka, Japan. DBEF-Qv3 (560) was then laminated to the new absorbing polarizer. The resulting construction 500 is displayed in FIG. 5, and included the following: viewer side absorbing polarizer, including a protecting film, iodine stained poly(vinyl alcohol) or PVA (510), and compensation film (520), which was adhered to the Vertically Aligned (VA) type TFT-LCD panel (color filter on array, COA type, $I_{back}$ [550]<$I_{front}$ [550]) (530) supplied by Samsung Display Corp., Suwon, South Korea. With optically clear adhesive (OCA) on the opposite side (backlight side) of the display (530) was laminated the viewing angle compensation film (550). Beneath the viewing angle compensation film (550) was laminated the DBEF-Qv3 sheet (560), and beneath the DBEF-Qv3 sheet a prism film sheet (570), and then a diffuser sheet (580) was located. The luminance and contrast ratio measured for Example 1 were 323 cd/m² and 3764. Thus, compared to Comparative Example 5, Example 1 has approximately 5 percent less brightness and 107 percent the contrast ratio.

Example 2

Figure 6:
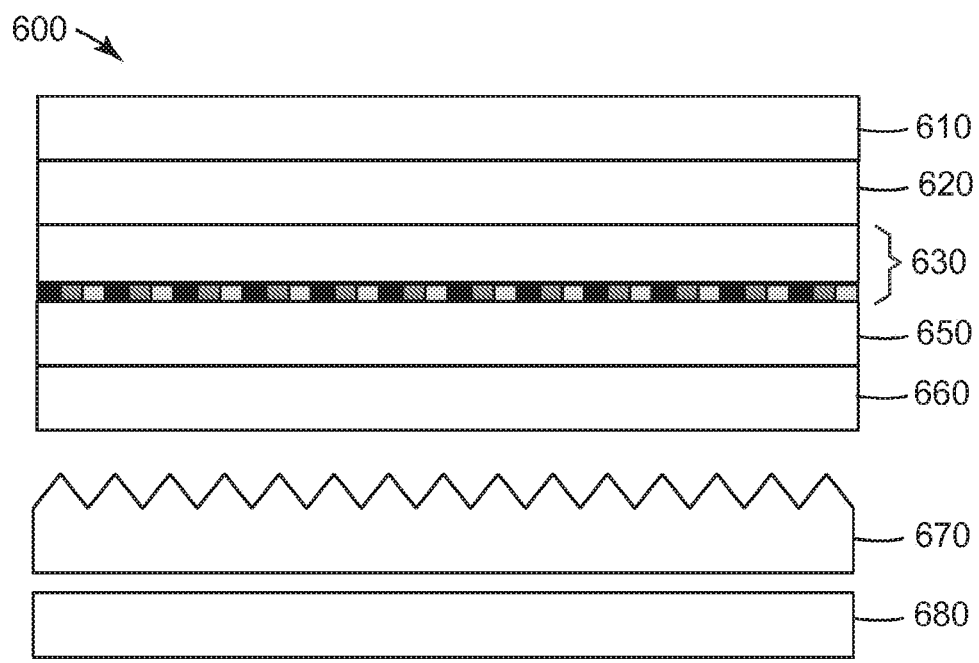
FIG. 6 is an elevation cross-section of the optical stack of Example 2.

An optical stack was assembled as in Example 1, except that the viewer side absorbing polarizer (510) was removed. In its place, an absorbing polarizer (610) with a new viewing angle compensation film (Re=65 nm and Rth=260 nm, available from Zeon Corp, Tokyo, Japan) (620) was laminated to the COA VA TFT-LCD panel (630). The absorbing polarizer (610) was supplied by Nitto Denko Corp, Osaka, Japan. The resulting construction 600 is displayed in FIG. 6, and also included the viewing angle compensation film of Example 1 (650) laminated with optically clear adhesive (OCA) on the opposite side (backlight side) of the display (630). Beneath the viewing angle compensation film (650) was laminated the DBEF-Qv3 sheet (660) of Example 1, and beneath the DBEF-Qv3 sheet was laminated a prism film sheet (670), and then a diffuser sheet (680). The luminance and contrast ratio measured for Example 2 were 343 cd/m² and 4590. Thus, compared to Comparative Example 5, Example 2 has approximately 101 percent less brightness and 130 percent the contrast ratio. Thus, the COA type VA TFT-LCD display possesses surprisingly higher contrast ratio relative to other VA type LCD displays even when using only one compensation film.

|  | Comparative Example 5 | Comparative Example 6 | Example 1 | Example 2 |
|---|---|---|---|---|
| Luminance (cd/m$^2$) | 341 | 348 | 323 | 343 |
| % Ratio | 100% | 102% | 95% | 101% |
| Contrast Ratio | 3525 | 2784 | 3764 | 4590 |
| % Ratio | 100% | 79% | 107% | 130% |

All U.S. patents and patent applications cited in the present application are incorporated herein by reference as if fully set forth. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. An optical stack, comprising:
    a liquid crystal panel including a color filter array, the liquid crystal panel including a filter side closest to the color filter array and a non-filter side opposite the filter side;
    an absorbing polarizer laminated directly to the liquid crystal panel on the filter side thereof; and
    a reflective polarizer laminated directly to the absorbing polarizer.

2. The optical stack of claim 1, further comprising a compensation film laminated to the non-filter side of the liquid crystal panel.

3. The optical stack of claim 2, wherein the optical stack includes only a single compensation film.

4. The optical stack of claim 2, wherein the optical stack has 90% or more luminance compared with a second optical stack, the second optical stack being identical to the optical stack except for having a second compensation film disposed between the absorbing polarizer and the liquid crystal panel.

5. The optical stack of claim 4, wherein the optical stack has 95% or more luminance compared with the second optical stack.

6. The optical stack of claim 5, wherein the optical stack has 100% or more luminance compared with the second optical stack.

7. The optical stack of claim 4, wherein the optical stack has an equal or greater contrast ratio in the normal direction of a surface of the liquid crystal panel compared with the second optical stack.

8. The optical stack of claim 2, further comprising a second absorbing polarizer laminated to the compensation film.

9. The optical stack of claim 8, further comprising a protective film laminated to the second absorbing polarizer.

10. The optical stack of claim 1, wherein the color filter array is a RGB color filter array.

11. The optical stack of claim 1, wherein the liquid crystal panel is a vertically aligned type panel.

12. The optical stack of claim 1, wherein the liquid crystal panel further includes a first outer layer and a second outer layer.

13. The optical stack of claim 12, wherein the first and second outer layers are glass.

14. The optical stack of claim 12, wherein the first and second outer layers are polymeric.

15. The optical stack of claim 1, wherein the reflective polarizer is a multilayer optical film.

16. The optical stack of claim 1, wherein the reflective polarizer is a one-packet multilayer optical film.

17. The optical stack of claim 1, wherein the optical stack is thinner than about 350 microns.

18. A liquid crystal display, comprising the optical stack of claim 1.

19. An optical stack, comprising:
    a liquid crystal panel including
        a backlight-side substrate;
        a front-side substrate;
        a liquid crystal layer disposed between the backlight-side substrate and the front-side substrate, a light-scattering intensity ($I_{back}$ [550]) of the backlight-side substrate being higher than a higher light-scattering intensity ($I_{front}$ [550]) of the front-side substrate;
    an absorbing polarizer laminated directly to the backlight-side substrate; and
    a reflective polarizer laminated directly to the absorbing polarizer.

* * * * *